(12) United States Patent
Lu et al.

(10) Patent No.: US 12,167,401 B2
(45) Date of Patent: Dec. 10, 2024

(54) METHOD FOR SL BSR IMPLEMENTATION AND RELATED PRODUCTS

(71) Applicant: GUANGDONG OPPO MOBILE TELECOMMUNICATIONS CORP., LTD., Guangdong (CN)

(72) Inventors: Qianxi Lu, Guangdong (CN); Zhenshan Zhao, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 275 days.

(21) Appl. No.: 17/563,752

(22) Filed: Dec. 28, 2021

(65) Prior Publication Data
US 2022/0124778 A1    Apr. 21, 2022

Related U.S. Application Data

(63) Continuation of application No. PCT/CN2019/094627, filed on Jul. 3, 2019.

(51) Int. Cl.
| H04W 4/00 | (2018.01) |
| H04W 28/02 | (2009.01) |
| H04W 72/21 | (2023.01) |
| H04W 72/23 | (2023.01) |
| H04W 80/02 | (2009.01) |
| H04W 92/18 | (2009.01) |

(52) U.S. Cl.
CPC ....... H04W 72/21 (2023.01); H04W 28/0278 (2013.01); H04W 72/23 (2023.01); *H04W 80/02* (2013.01); *H04W 92/18* (2013.01)

(58) Field of Classification Search
CPC ..... H04W 72/21; H04W 72/23; H04W 80/02; H04W 92/18; H04W 28/0278
See application file for complete search history.

(56) References Cited

U.S. PATENT DOCUMENTS

| 2016/0044707 A1* | 2/2016 | Folke ............... H04W 72/1268 370/329 |
| 2016/0128094 A1* | 5/2016 | Lee ........................ H04W 72/23 370/329 |
| 2017/0374674 A1* | 12/2017 | Lee ........................ H04W 76/14 |

(Continued)

FOREIGN PATENT DOCUMENTS

| CN | 107079530 A | 8/2017 |
| CN | 108432309 A | 8/2018 |

(Continued)

OTHER PUBLICATIONS

Chinese First Office Action with English Translation for CN Application 202210022277.9 mailed Feb. 25, 2023. (22 pages).

(Continued)

*Primary Examiner* — Abdelnabi O Musa
(74) *Attorney, Agent, or Firm* — Young Basile Hanlon & MacFarlane, P.C.

(57) ABSTRACT

A method for sidelink (SL) implementation and related products are provided. The method includes reporting an SL buffer status report (BSR) in preference to an uplink (UL) BSR. In a medium access control (MAC) protocol data unit (PDU), the SL BSR is contained first, and then the UL BSR is contained.

11 Claims, 5 Drawing Sheets

(56) References Cited

U.S. PATENT DOCUMENTS

| | | | |
|---|---|---|---|
| 2018/0054755 A1* | 2/2018 | Lee | H04W 72/21 |
| 2018/0279162 A1* | 9/2018 | Yi | H04W 72/569 |
| 2018/0324838 A1 | 11/2018 | Folke et al. | |
| 2020/0029353 A1* | 1/2020 | Xu | H04W 72/21 |
| 2020/0229198 A1* | 7/2020 | Kung | H04W 72/54 |
| 2021/0204100 A1* | 7/2021 | Lin | H04W 72/02 |
| 2021/0211845 A1* | 7/2021 | Lin | H04W 4/40 |
| 2021/0212029 A1* | 7/2021 | Zhao | H04W 72/21 |
| 2021/0314808 A1* | 10/2021 | Zhang | H04W 28/0278 |
| 2022/0086871 A1* | 3/2022 | Lu | H04W 28/0278 |
| 2022/0167441 A1* | 5/2022 | Lee | H04W 28/0278 |
| 2022/0183031 A1* | 6/2022 | Zhang | H04W 72/21 |
| 2023/0397293 A1* | 12/2023 | Lu | H04W 76/14 |

FOREIGN PATENT DOCUMENTS

| | | |
|---|---|---|
| CN | 109219024 A | 1/2019 |
| CN | 105934987 B | 5/2019 |
| CN | 109891987 A | 6/2019 |
| EP | 3178277 A1 | 6/2017 |
| EP | 3178277 B1 | 11/2019 |
| JP | 2017528062 A | 9/2017 |
| WO | 2016020881 A1 | 2/2016 |
| WO | 2018201390 A1 | 11/2018 |

OTHER PUBLICATIONS

Communication pursuant to Article 94(3) EPC for EP Application 19935797.1 mailed Jan. 25, 2023. (9 pages).
Chinese Rejection decision with English Translation for CN Application 202210022277.9 mailed Jul. 3, 2023. (11 pages).
Chinese Second Office Action with English Translation for CN Application 202210022277.9 mailed May 6, 2023. (14 pages).
Japanese Notice of Reasons for Refusal with English Translation for JP Application 2021576721 mailed May 23, 2023. (10 pages).
3GPP TSG-RAN WG2 #106 TDoc, Reno, USA, R2-1907354, Ericsson, gNB-Scheduled Resource Allocation for Sidelink, May 13-17, 2019. (4 pages).
3GPP TSG-RAN WG2 Meeting #105bis, Xi'an, China, R2-1903144, CATT, Prioritization rule for SR-PUSCH collision, Apr. 8-12, 2019. (4 pages).
Extended European Search Report for EP Application 19935797.1 mailed May 10, 2022. (10 pages).
Indian Examination Report for IN Application 202127058865 mailed May 31, 2022. (7 pages).
Huawei, HiSilicon, Discussion on SL BSR procedure for NR SL Mode-1, 3GPP TSG-RAN WG2 Meeting #106, R2-1907449, May 13-17, 2019. (8 pages).
Huawei, HiSilicon, Discussion on SL BSR for Mode 1, 3GPP TSG-RAN WG2 # 105bis, R2-1904089, Apr. 8-Apr. 12, 2019. (3 pages).
Japanese Decision of Rejection with English Translation for JP Application 2021576721 mailed Oct. 6, 2023. (8 pages).
International Search Report with English Translation for PCT Application PCT/CN2019/094627 mailed Mar. 25, 2020 (12 pages).
3GPP TSG RAN Meeting #80 La Jolla, USA, RP-181429, Vodafone, New SID: Study on NR V2X, Jun. 11-14, 2018. (5 pages).
Notice of Preliminary Rejection with English translation, issued in corresponding KR Application No. 10-2021-7042919 dated Oct. 16, 2024, 16 pages.

* cited by examiner

METHOD FOR SL BSR IMPLEMENTATION AND RELATED PRODUCTS

CROSS-REFERENCE TO RELATED APPLICATION(S)

This application is a continuation of International Application No. PCT/CN2019/094627, filed on Jul. 3, 2019, the disclosure of which is hereby incorporated by reference in its entirety.

TECHNICAL FIELD

Implementations of the present disclosure relate to the field of terminal technology, and in particular, to a method for sidelink (SL) implementation and related products.

BACKGROUND

Device-to-device (D2D) communication is a D2D-based sidelink (SL) transmission technology. Different from a typical cellular system in which communication data is received or sent through a base station, an internet of vehicles (IoV) system adopts a terminal-to-terminal direct communication, thereby achieving a higher spectrum efficiency and a lower transmission delay.

The existing network cannot get an SL buffer status report (BSR) in time, which affects transmission of SL data.

SUMMARY

The present disclosure provides a method for sidelink (SL) implementation and related products.

In a first aspect, implementations of the present disclosure provide a method for SL implementation. The method includes reporting an SL BSR in preference to an uplink (UL) BSR.

In a second aspect, an electronic device is provided. The electronic device includes a processor and a memory storing a computer program which, when executed by the processor, causes the processor to report an SL BSR in preference to a UL BSR.

In a third aspect, a non-transitory computer-readable storage medium is provided. The storage medium stores a computer program which, when executed by a processor, causes the processor to perform an action of reporting an SL BSR in preference to a UL BSR.

BRIEF DESCRIPTION OF DRAWINGS

To illustrate technical solutions in implementations of the present disclosure more clearly, the following briefly introduces accompanying drawings required for describing the implementations. Apparently, the accompanying drawings described in the following illustrate some implementations of the present disclosure. Those of ordinary skill in the art may also obtain other accompanying drawings based on these accompanying drawings without creative efforts.

DETAILED DESCRIPTION

The present disclosure will be further illustrated in detail in the following with reference to accompanying drawings and implementations. It can be understood that the specific implementations described herein are only used to explain the present disclosure, rather than to limit the present disclosure. In addition, it can be noted that, for ease of illustration, in the accompany drawings only a part of structures related to the present disclosure instead of all the structures are illustrated.

Electronic devices involved in the implementations of the present disclosure may include various devices with wireless communication functions such as handheld devices (such as smart phones), in-vehicle devices, wearable devices, and computing devices, or other processing devices coupled to wireless modems, as well as various user equipment (UE), mobile stations (MS), terminal devices, R&D/test platforms, servers, etc. For ease of illustration, the devices mentioned above are collectively referred to as electronic devices.

D2D refers to a device-to-device communication. In the 3rd generation partnership project (3GPP), D2D is divided into 3 stages illustrated as follows.

Proximity based service (ProSe): in Rel-12/13, the D2D communication is researched for a ProSe scenario, which is mainly for public safety services.

Vehicle to everything (V2X): in Rel-14/15, the V2X system is researched for a scenario of vehicle-to-vehicle communication, which is mainly oriented to services of vehicle-vehicle communication and vehicle-to-people communication with a relatively high movement speed.

Further enhancements to long term evolution (LTE) device to device (FeD2D) for wearable devices: in Rel-14, FeD2D is researched for a scenario where a wearable device accesses a network through a mobile phone, which is mainly oriented to scenarios with a low movement speed and low power access.

D2D in the 3GPP can be divided into two mode architectures, namely a mode A architecture and a mode B architecture.

Figure 1A:
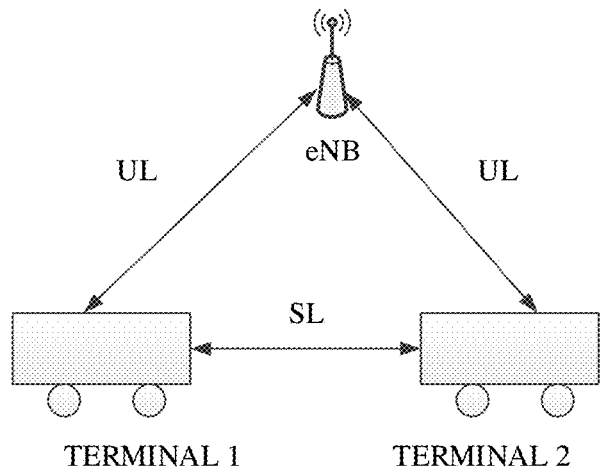
FIG. 1a is a schematic diagram illustrating a network structure of mode A provided by an implementation of the present disclosure.

As illustrated in FIG. 1a, the mode A architecture includes a terminal 1, a terminal 2, and an evolved node B (eNB), where the terminal 1 and the terminal 2 are respectively connected to the eNB, and the terminal 1 and the terminal 2 are also connected. A connection link between the terminal 1 and the terminal 2 is a sidelink (SL), a connection link between the terminal 1 and the eNB is an uplink (UL), and a connection link between the terminal 2 and the eNB is a UL.

Figure 1B:
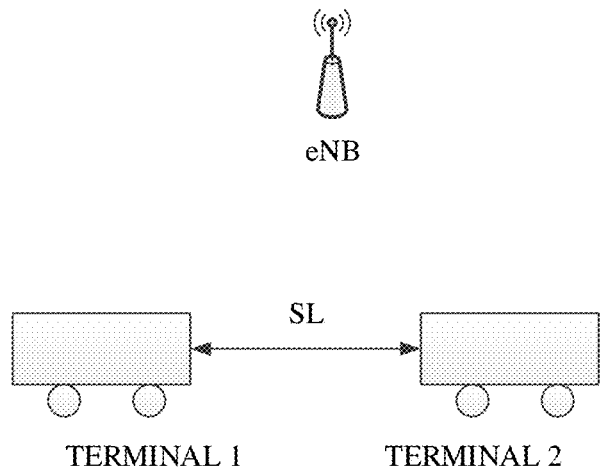
FIG. 1b is a schematic diagram illustrating a network structure of mode B provided by an implementation of the present disclosure.

As illustrated in FIG. 1b, the mode B architecture includes the terminal 1, the terminal 2, and the eNB, where the terminal 1 and the terminal 2 are not connected to the eNB, but the terminal 1 and the terminal 2 are connected. A connection link between the terminal 1 and the terminal 2 is an SL.

For the D2D communication, a buffer status report (BSR) needs to be reported. Performing the D2D or V2X communication by the UE is reported via the BSR. For different services the BSR may include a UL BSR and an SL BSR.

Figure 2A:
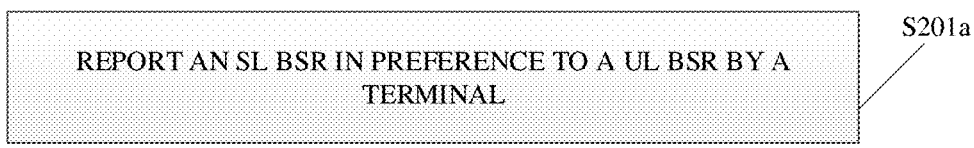
FIG. 2a is a schematic flow chart illustrating a method for sidelink (SL) implementation provided by an implementation of the present disclosure.

A method for SL implementation is provided in an implementation of the present disclosure. The method is implemented by a terminal. The terminal may be the terminal 1 or the terminal 2 illustrated in FIG. 1a or FIG. 1b. As illustrated in FIG. 2a, the method includes the following.

At block S201a, the terminal reports an SL BSR in preference to a UL BSR.

A reporting object at block S201a may vary. For example, in an implementation, the terminal that performs the operation at block S201a is located in the architecture illustrated in FIG. 1a, and the reporting object at block S201a may be the terminal 2 or the eNB. For another example, in another implementation, the terminal that performs the operation at block S201a is located in the architecture illustrated in FIG. 1b, and the reporting object at block S201a may be the terminal 2. Of course, a specific implementation manner is not limited to the specific reporting manner described above.

According to the technical solution provided by the implementation of the present disclosure, the SL BSR is set to be reported in preference to the UL BSR. In this way, in actual applications, a network side can obtain the SL BSR in time, thereby supporting preferential transmission of SL data.

In an implementation of the present disclosure, reporting the SL BSR in preference to the UL BSR may include any of the following cases.

Case A, in a medium access control (MAC) protocol data unit (PDU), the SL BSR is first contained, and then the UL BSR is contained.

In actual applications, in a resource of the MAC PDU in which a BSR can be added, the SL BSR is added first, and then the UL BSR is added. It can be noted that, the SL BSR being contained first in the MAC PDU refers to that the SL BSR has a higher priority than the UL BSR, and has no effect on a priority relationship between other data in the MAC PDU and the BSR. For example, if the MAC PDU contains data a with a priority higher than a priority of the BSR, the priority of data a is still higher than that of the SL BSR and the UL BSR.

Case B, in the MAC PDU, a first partial SL BSR is contained first, and then the UL BSR is contained.

The first partial SL BSR in case B refers to partial data of the SL BSR in case A.

In an implementation solution, the first partial SL BSR in case B may include a first SL BSR. Of course, in another implementation, the first partial SL BSR in case B may include the first SL BSR and part of a second SL BSR.

The first SL BSR refers to data of the SL BSR that satisfies a set condition, and the second SL BSR refers to data of the SL BSR that does not satisfy the set condition. The part of the second SL BSR may include partial data of the second BSR.

Case C, in the MAC PDU merely a second partial SL BSR is contained.

The second partial SL BSR in case C may include partial data of the SL BSR in case A. The first partial SL BSR may be the same as the second partial SL BSR. Of course, in different network cases, the first partial SL BSR may be different from the second partial SL BSR.

In case C, the second partial SL BSR may include the first SL BSR. Of course, in case C, the second partial SL BSR may include a part of the first SL BSR. The second partial SL BSR in case C may include the first SL BSR and part of the second SL BSR.

Case D, in the MAC PDU, the first SL BSR is contained first, then the UL BSR is contained, and then the second SL BSR is contained.

In actual operations, case D may be as follows. In the resource of the MAC PDU in which the BSR can be added, the SL BSR is added first, then the UL BSR is added, and finally the second SL BSR is added.

Case E, in the MAC PDU, the first SL BSR is contained first, then the UL BSR is contained, and then part of the second SL BSR is contained.

In actual operations, case E may be as follows. In the resource of the MAC PDU in which the BSR can be added, the SL BSR is added first, then the UL BSR is added, and finally part of the second SL BSR is added.

Figure 2B:
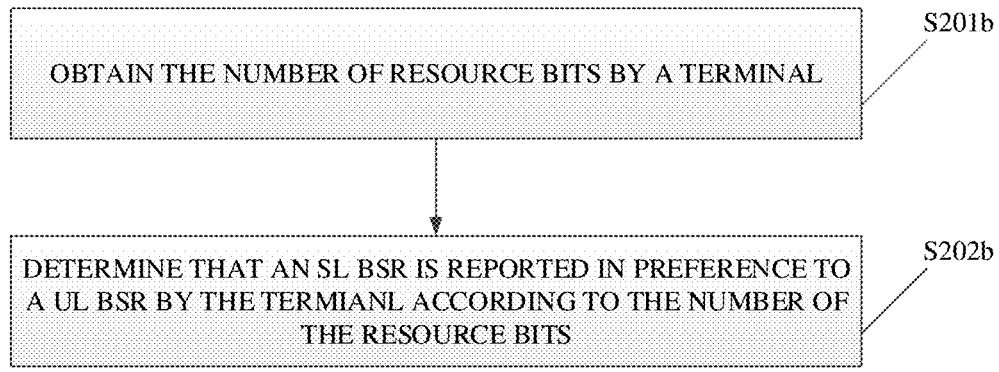
FIG. 2b is a schematic flow chart illustrating a method for SL implementation provided an implementation of the present disclosure.

A method for SL implementation is provided in another implementation of the present disclosure. The method is implemented by a terminal. The terminal may be the terminal 1 or the terminal 2 illustrated in FIG. 1a or 1b. As illustrated in FIG. 2b, the method includes the following.

At block S201b, the terminal obtains the number of resource bits.

At block S202b, the terminal determines that an SL BSR is reported in preference to the UL BSR according to the number of the resource bits.

According to the technical solution provided in the other implementation of the present disclosure, the SL BSR is set to be reported in preference to the UL BSR. In this way, in actual applications, if the number of the resource bits is limited, a network side can obtain the SL BSR first, thereby supporting preferential transmission of SL data.

According to a solution in another implementation, an implementation manner of the operation at block S202b may include any of the following cases.

Case a1, the number of resource bits satisfies a condition that the SL BSR and the UL BSR can be carried, i.e., the number of the resource bits≥(the number of bits of the SL BSR+the number of bits of the UL BSR), and it is determined that in an MAC PDU, the SL BSR is contained first, and then the UL BSR is contained.

Case a1 mentioned above is for a network status in which the number of the resource bits is relatively large. In this case, the number of the resource bits satisfies the condition that the SL BSR and the UL BSR can be fully carried. In case a1, in the MAC PDU, the SL BSR is carried first, and then the UL BSR is carried.

Case a2, the number of resource bits satisfies the condition that the SL BSR and the UL BSR can be carried, i.e., the number of the resource bits (the number of the bits of the SL BSR+the number of the bits of the UL BSR), and it is determined first, in the MAC PDU, a first SL BSR is contained first, then the UL BSR is contained, and then a second SL BSR is contained.

For definitions of the first SL BSR and the second SL BSR, reference can be made to illustrations for case B.

Case a2 is for a network status in which the number of the resource bits is relatively large. In this case, the number of the resource bits satisfies the condition that the SL BSR and the UL BSR can be fully carried. In case a2, in the MAC PDU, the first SL BSR is first carried, then the UL BSR is carried, and finally the second SL BSR is carried. In case a2, it mainly ensures that the first SL BSR with a relatively high priority can be reported to the network side, then it ensures that the UL BSR can be reported to the network side, and finally it ensures the second SL BSR with a relatively low priority can be reported to the network side.

Case b1, the number of resource bits satisfies a condition that the first SL BSR and the UL BSR can be carried and/or does not satisfy a condition that the SL BSR and the UL BSR can be fully carried, i.e., (the number of bits of the first SL BSR+the number of the bits of the UL BSR)≤the number of the resource bits<(the number of the bits of the SL BSR+the number of the bits of the UL BSR), (the number of the bits of the first SL BSR+the number of the bits of the UL BSR)≤the number of the resource bits, or the number of the resource bits<(the number of the bits of the SL BSR+the number of the bits of the UL BSR), and it is determined that in the MAC PDU, the first SL BSR is contained first, then the UL BSR is contained, and then part of the second SL BSR is contained.

Case b1 mentioned above is for a network status in which the number of the resource bits is relatively large (the number of the resource bits in case b1 is smaller than that in case a1 or case a2). In this case, the number of the resource bits does not satisfy the condition that the SL BSR and the UL BSR can be fully carried, but satisfies the condition that the first SL BSR and the UL BSR can be fully carried. In case b1, in the MAC PDU, the first SL BSR is carried first, and then the UL BSR is carried. Since the number of the resource bits does not satisfy a condition that the second SL BSR with the relatively low priority can be fully carried, and thus finally a part of the second SL BSR is carried. In case b1, it mainly ensures that the first SL BSR with the relatively high priority can be reported to the network side, then it ensures that the UL BSR can be reported to the network side, and finally it ensures that a part of the second SL BSR with the relatively low priority can be reported to the network side.

Case b2, the number of resource bits satisfies the condition that the first SL BSR and the UL BSR can be carried and/or does not satisfy the condition that the SL BSR and the UL BSR can be fully carried, i.e., (the number of the bits of the first SL BSR+the number of the bits of the UL BSR)≤the number of the resource bits<(the number of the bits of the SL BSR+the number of the bits of the UL BSR), (the number of the bits of the first SL BSR+the number of the bits of the UL BSR)≤the number of the resource bits, or the number of the resource bits<(the number of the bits of the SL BSR+the number of the bits of the UL BSR), and it is determined that in the MAC PDU, the first SL BSR is contained first, and then the UL BSR is contained.

The number of the resource bits in case b2 is smaller than that in case b1. Under this condition, although the number of the resource bits in case b2 satisfies the condition that the first SL BSR and the UL BSR can be fully carried, in the MAC PDU, except the resource bits that carry the first SL BSR and the UL BSR, the number of remaining resource bits is relatively small or there is no remaining resource bit, and thus the second SL BSR cannot be carried.

Case c1, the number of resource bits satisfies a condition that the first SL BSR can be carried and/or does not satisfy the condition that the first SL BSR and the UL BSR can be fully carried, i.e., the number of the bits of the first SL BSR≤the number of the resource bits<(the number of the bits of the first SL BSR+the number of the bits of the UL BSR), the number of the bits of the first SL BSR≤the number of the resource bits, or the number of the resource bits<(the number of the bits of the first SL BSR+the number of the bits of the UL BSR), and it is determined that in the MAC PDU, the first SL BSR is contained first, and then a part of the UL BSR is contained.

The number of the resource bits in case c1 is smaller than that in case b2. Under this condition, in case c1, the number of the resource bits satisfies the condition that the first SL BSR can be fully carried, but does not satisfy the condition that the first SL BSR and the UL BSR can be fully carried. In this case, in the MAC PDU, the first SL BSR with the relatively high priority is carried first. In this case, in the MAC PDU remaining resource bits cannot carry all of the UL BSR, and thus in the MAC PDU a part of the UL BSR is carried.

Case c2, the number of resource bits satisfies the condition that the first SL BSR can be carried and/or does not satisfy the condition that the first SL BSR and the UL BSR can be fully carried, i.e., the number of the bits of the first SL BSR≤the number of the resource bits<(the number of the bits of the first SL BSR+the number of the bits of the UL BSR), the number of the bits of the first SL BSR≤the number of the resource bits, or the number of the resource bits<(the number of the bits of the first SL BSR+the number of the bits of the UL BSR), and it is determined that in the MAC PDU, the first SL BSR is contained first, and then the second SL BSR is contained.

The number of the resource bits in case c2 is smaller than that in case b2. Under this condition, in case c2, the number of the resource bits satisfies the condition that the first SL BSR can be fully carried, but does not satisfy the condition that the first SL BSR and the UL BSR can be fully carried. In this case, in the MAC PDU, the first SL BSR with the relatively high priority is carried first. In this case, if there are more remaining resource bits in the MAC PDU, in the MAC PDU the second SL BSR is carried.

Case c3, the number of resource bits satisfies the condition that the first SL BSR can be carried and/or does not satisfy the condition that the first SL BSR and the UL BSR can be fully carried, i.e., the number of the bits of the first SL BSR≤the number of the resource bits<(the number of the bits of the first SL BSR+the number of the bits of the UL BSR), the number of the bits of the first SL BSR≤the number of the resource bits, or the number of the resource bits<(the number of the bits of the first SL BSR+the number of the bits of the UL BSR), and it is determined that in the MAC PDU, only the first SL BSR is contained.

The number of the resource bits in case c3 is smaller than that in case c1 or case c2. Under this condition, the number of the resource bits in case c3 satisfies the condition that the first SL BSR can be fully carried, but does not satisfy the condition that the UL BSR or the second SL BSR can be fully carried. In this case, in the MAC PDU, the first SL BSR with the relatively high priority is carried first. In this case, there is less or no remaining bits in the MAC PDU, and the remaining bits in the MAC PDU can be filled. Thus, in the MAC PDU, the UL BSR and the second SL BSR cannot be both contained.

Case d, the number of resource bits does not satisfy the condition that the first SL BSR can be fully carried, i.e, the number of the resource bits<the number of the bits of the first SL BSR, and it is determined that in the MAC PDU only part of the first SL BSR is contained.

The number of the resource bits in case d is smaller than that in case c3. Under this condition, the number of the resource bits in case d does not satisfy the condition that the first SL BSR can be fully carried, and thus in the MAC PDU only part of the first SL BSR is contained.

The part of the first SL BSR mentioned above may be obtained by truncating the first SL BSR. Of course, in practical applications, other manners may also be used to obtain the part of the first SL BSR. Of course, the part of the second SL BSR mentioned above can also be obtained in the manner of obtaining the part of the first SL BSR mentioned above.

The set condition in the implementation illustrated in FIG. 2a and FIG. 2b may refer to that if an attribute associated with the SL BSR satisfies an attribute requirement, it is determined that the set condition is satisfied. The attribute associated with the above SL BSR may be one or any combination of: an attribute of to-be-transmitted data, an attribute of a logical channel, an attribute of a logical channel group, and an attribute of a destination address. The above attribute requirement may be an attribute requirement of a network configuration, an attribute requirement of an upper layer indication, or a pre-configured attribute requirement.

The attribute requirement of the network configuration may refer to that, for a network scenario illustrated in FIG. 1a, the attribute requirement of the network configuration may be an attribute requirement of a network configuration sent by the eNB to the terminal. The attribute requirement of the upper layer indication may refer to that for a network scenario illustrated in FIG. 1b, the upper layer indication may include the number of resource bits selected from a resource pool by the terminal 1 or the terminal 2. Then the terminal 1 determines the number of resource bits via the upper layer indication. The pre-configured attribute requirement may be included in factory setting. Of course, the pre-configured attribute requirement may be pre-configured by a user.

Figure 3:
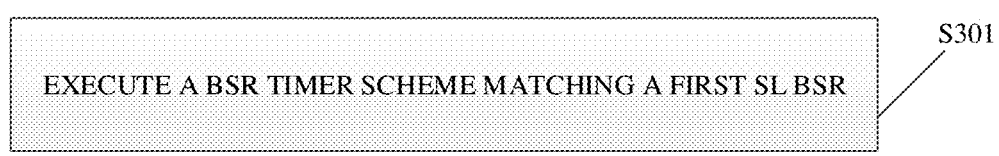
FIG. 3 is a schematic flow chart illustrating a buffer status report (BSR) timer scheme provided by an implementation of the present disclosure.

Referring to FIG. 3, another implementation of the present disclosure provides a BSR timer scheme for the implementation illustrated in FIG. 2a and the implementation illustrated in FIG. 2b. Since an SL BSR in a protocol is different in one implementation and another implementation, an original BSR timer scheme may be modified. Therefore, based on the implementations illustrated in FIG. 2a and FIG. 2b, in the other implementation of the present disclosure, the following operations are added.

At block S301, execute a BSR timer scheme matching the first SL BSR.

It can be noted that the operation at block S301 may be executed before or after the operation at block S201a in the implementation illustrated in FIG. 2a, and may be executed before or after any operation in the implementation illustrated in FIG. 2b. That is, there is no logical sequence between execution of the operation at block S301 and execution of any operation in the implementation illustrated in FIG. 2a or FIG. 2b.

According to a technical solution in the other implementation, the operation at block S301 can be implemented as follows. A BSR timer is restarted in response to transmission of the first BSR or part of the first BSR, the first BSR is triggered in response to expiration of the BSR timer, and the BSR timer is restarted in response to reception of the SL grant.

Triggering the first BSR includes but is not limited to triggering a first BSR event. Triggering the first BSR event includes but is not limited to that the terminal starts preparing or prepares related data of the first BSR, or the terminal starts preparing or prepares related data of part of the first BSR.

According to another solution in the other implementation, the operation at block S301 can be implemented as follows. The BSR timer is restarted in response to transmission of the first BSR or part of the first BSR, and the SL BSR is triggered in response to expiration of the BSR timer.

Triggering the SL BSR includes but is not limited to triggering an SL BSR event. Triggering the SL BSR event includes but is not limited to that the terminal starts preparing or prepares related data of the SL BSR, or the terminal starts preparing or prepares related data of part of the SL BSR. The part of the SL BSR may be the first SL BSR mentioned above.

Figure 4:
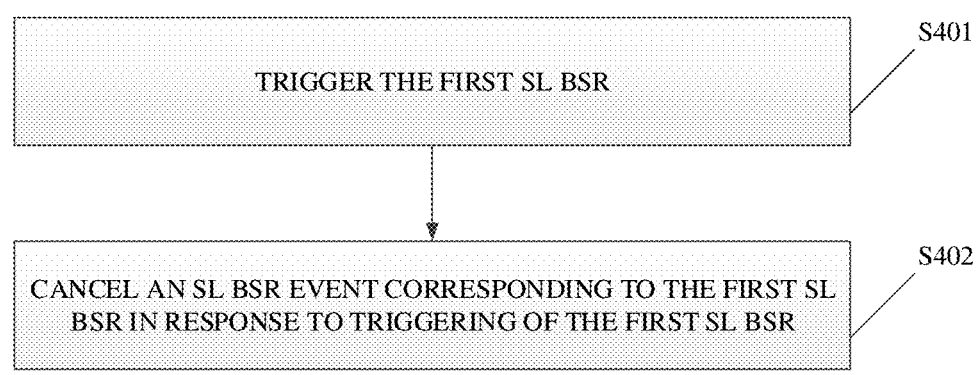
FIG. 4 is a schematic flow chart illustrating an event processing scheme provided by an implementation of the present disclosure.

Referring to FIG. 4, a further implementation of the present disclosure provides an SL BSR event processing scheme for the implementation illustrated in FIG. 2a and the implementation illustrated in FIG. 2b. Since an SL BSR in a protocol is different in one implementation and another implementation, an original BSR processing scheme may be modified. Therefore, based on the implementations in FIG. 2a and FIG. 2b, in the further implementation of the present disclosure, the following operations are added.

At block S401, trigger the first SL BSR.

Triggering the first SL BSR at block S401 includes but is not limited to that start preparing or prepare related data of the first BSR or related data of part of the first BSR.

At block S402, cancel an SL BSR event corresponding to the first SL BSR in response to triggering of the first SL BSR.

The operations at blocks S401 and S402 may be executed before or after the operation at block S201a. The operations at blocks S401 and S402 may be executed before or after the operation at block S202b.

Figure 5:
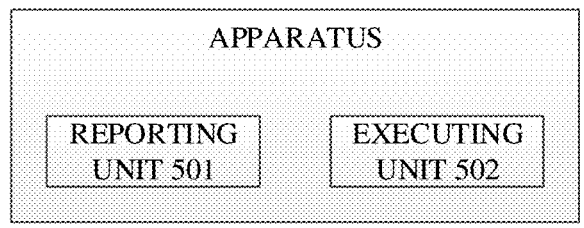
FIG. 5 is a schematic structural diagram illustrating an apparatus provided by an implementation of the present disclosure.

Referring to FIG. 5, FIG. 5 illustrates an apparatus. The apparatus includes a reporting unit 501 configured to report an SL BSR in preference to a UL BSR.

For a manner in which the reporting unit 501 reports the SL BSR in preference to the UL BSR, reference can be made to illustration of the implementation illustrated in FIG. 2a or FIG. 2b, which will not be repeated herein.

In an implementation, the apparatus may further include an executing unit 502 configured to execute a BSR timer scheme matching a first SL BSR.

For the above BSR timer scheme, reference can be made to illustration of the implementation illustrated in FIG. 3.

Figure 6:
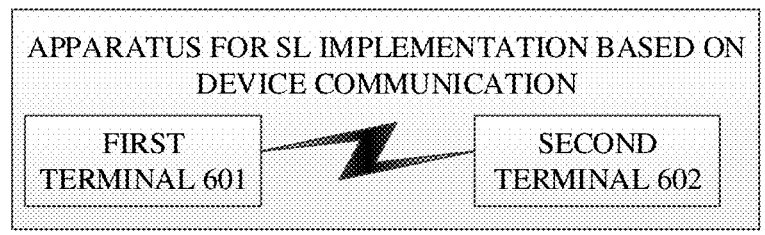
FIG. 6 is a schematic structural diagram illustrating an apparatus for SL implementation provided by an implementation of the present disclosure.

Referring to FIG. 6, FIG. 6 provides a system for SL implementation. The system include a first terminal 601 and a second terminal 602. The first terminal 601 or the second terminal 602 is configured to report an SL BSR in preference to a UL BSR.

Figure 7A:
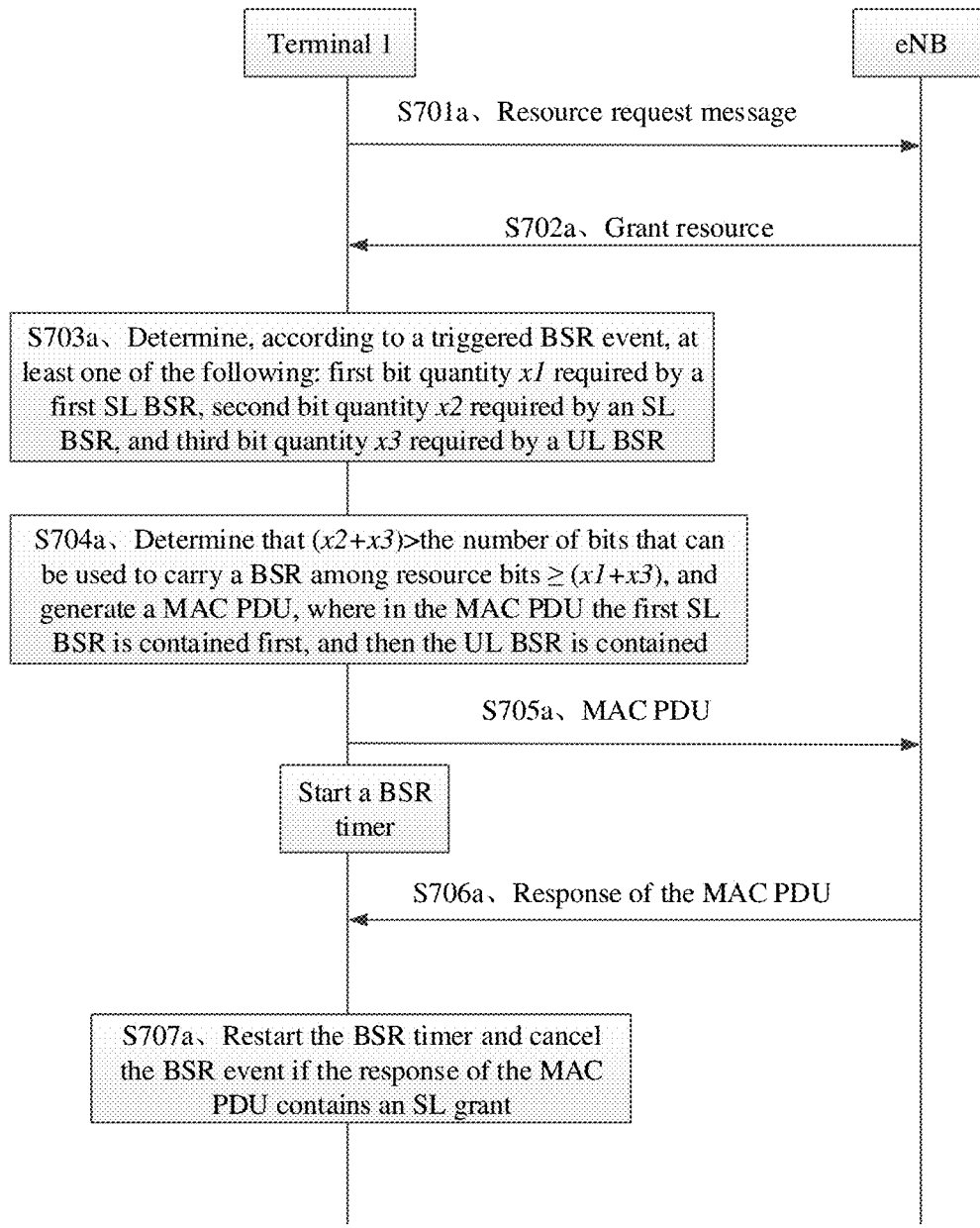
FIG. 7a is a schematic flow chart illustrating a method for SL implementation provided by an implementation of the present disclosure.

Referring to FIG. 7a, a method for SL implementation is provided in an implementation of the present disclosure. The method is implemented by a network topology structure illustrated in FIG. 1a. As illustrated in FIG. 1a, a protocol of a communication between the terminal 1 and the terminal 2 may be based on LET, and a protocol of a communication between the terminal 1 and the eNB or between the terminal 2 and the eNB may also be based on LET. Of course, in actual applications, the protocol of the communication between the terminal 1 and the terminal 2 may also be based on new radio (NR). Of course, the protocol of the communication between the terminal 1 and the eNB or between the terminal 2 and the eNB may also be based on NR. As illustrated in FIG. 7a, the method may include the following.

At block S701a, the terminal 1 transmits a resource request message to the eNB.

At block S702, the eNB transmits a grant resource to the terminal 1, where the grant resource may be indicative of the number of resource bits that the terminal 1 can be transmitted.

At block S703a, the terminal 1 determines, according to a triggered BSR event, at least one of the following: first bit quantity x1 required by a first SL BSR, second bit quantity x2 required by an SL BSR, and third bit quantity x3 required by a UL BSR.

A format of the SL BSR varies according to different protocol formats. For example, if based on the LET protocol, the format of the SL BSR is illustrated as Table 1.

TABLE 1

| Destination index$_1$ | LCG ID$_1$ | Buffer Size$_1$ |
| Buffer Size$_1$ | Destination index$_2$ | |
| LCG ID$_2$ | Buffer Size$_2$ | |

Destination index$_1$ represents destination address 1, LCG ID$_1$ represents a logical channel group identifier, and buffer size$_1$ represents buffer capacity 1.

For example, if based on the NR protocol, the format of the SL BSR is illustrated as Table 2.

TABLE 2

| Dest index | LCG ID |
| Buffer Size$_1$ | |
| Dest index | LCG ID |
| Buffer Size | |

Dest index in Table 2 represents a destination address.

At block S704a, the terminal 1 determines that (x2+x3) >the number of bits that can be used to carry a BSR among resource bits≥(x1+x3), and generates a MAC PDU, where in the MAC PDU the first SL BSR is contained first, and then the UL BSR is contained.

At block S705a, the terminal 1 transmits the MAC PDU to the eNB and starts a BSR timer.

At block S706a, the eNB transmits a response of the MAC PDU to the terminal 1.

At block S707a, the terminal 1 receives the response of the MAC PDU from the eNB, and restarts the BSR timer and cancels the BSR event if the response of the MAC PDU contains an SL grant.

According to the technical solution provided by the other implementation of the present disclosure, the SL BSR is set to be reported in preference to the UL BSR. In this case, in actual applications, if the number of resource bits is limited, a network side can be enabled to obtain the SL BSR first, thereby supporting transmission of SL data.

Figure 7B:
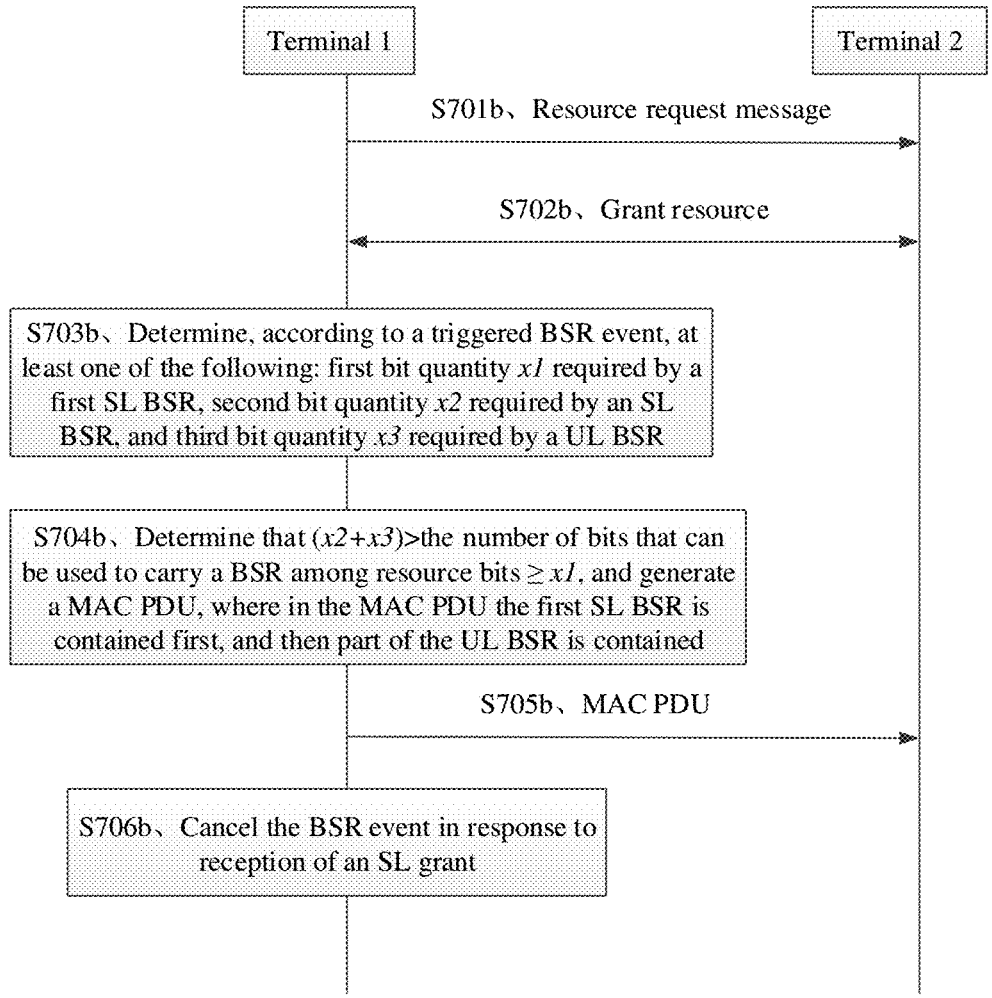
FIG. 7b is a schematic flow chart illustrating a method for SL implementation provided by another implementation of the present disclosure.

Referring to FIG. 7b, a method for SL implementation based on device communication is provided in an implementation of the present disclosure. The method is implemented by a network topology structure illustrated in FIG. 1b. As illustrated in FIG. 1b, a protocol of a communication between the terminal 1 and the terminal 2 may be based on LET or NR. As illustrated in FIG. 7b, the method may include the following.

At block S701b, the terminal 1 transmits a resource request message to the terminal 2.

At block S702b, the terminal 2 transmits a grant resource to the terminal 1 (the grant resource may be selected from a resource pool), where the grant resource may be indicative of the number of resource bits that can be transmitted by the terminal 1.

At block S703b, the terminal 1 determines, according to a triggered BSR event, at least one of the following: first bit quantity x1 required by a first SL BSR, second bit quantity x2 required by an SL BSR, and third bit quantity x3 required by a UL BSR.

At block S704b, the terminal 1 determines that (x2+x3) >the number of bits that can be used to carry a BSR among resource bits≥x1, and generates a MAC PDU, where in the MAC PDU the first SL BSR is contained first, and then part of the UL BSR is contained.

At block S705b, the terminal 1 transmits the MAC PDU to the terminal 2.

At block S706b, the terminal 1 cancels the BSR event in response to reception of an SL grant transmitted by the terminal 2.

According to the technical solution provided by the other implementation of the present disclosure, the SL BSR is set to be reported in preference to the UL BSR. In this case, in actual applications, if the number of resource bits is limited, a network side can be enabled to obtain the SL BSR first, thereby supporting transmission of SL data.

Implementations of the present disclosure further provide an electronic device. The electronic device includes a processor and a memory. The memory is configured to store one or more programs which are configured to be executed by the processor. The one or more programs include instructions for performing any operation in any of the above methods.

Implementations of the present disclosure further provide a computer-readable storage medium storing a computer program for electronic data exchange. The computer program enables a computer to perform any operation in any of the above methods.

Implementations of the present disclosure further provide a computer program product. The computer program product includes a non-transitory computer-readable storage medium that stores a computer program. The computer program may be operable with a computer to perform any of the above methods.

It is to be noted that for the foregoing method implementations, for the sake of simple illustration, the method implementations are all expressed as a series of action combinations, but those skilled in the art can know that the present disclosure is not limited by the described action sequence. Because according to the present disclosure, some operations can be performed in other order or at the same time. Secondly, those skilled in the art can also know that the implementations described in the specification are all preferred implementations, and the actions and modules involved are not necessarily required by the present disclosure.

In the above-mentioned implementations, the illustrations of each implementation has its own emphasis. For parts that are not described in detail in an implementation, reference may be made to related illustrations in other implementations.

According to several implementations provided in the present disclosure, it can be appreciated that the apparatuses disclosed in the implementations herein may be implemented in other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection between devices or units through some interfaces, and may be electrical coupling or the like.

Units illustrated as separated parts may or may not be physically separated. Parts displayed as units may or may not be physical units, and may reside at one location or may be distributed to multiple networked units. Some of or all the units may be selected according to practical needs to achieve objectives of the solutions of the present disclosure.

In addition, the functional units in the various implementations of the present disclosure may be integrated into one processing unit, or each unit may exist alone physically, or two or more units may be integrated into one unit. The above-mentioned integrated units can be implemented in the form of hardware or software program modules.

If the integrated units are implemented as software functional modules and sold or used as standalone products, they may be stored in a computer-readable storage medium. Based on such an understanding, the essential technical solution, or the portion that contributes to the relate art, or all or part of the technical solution of the present disclosure may be embodied as software products. The computer software products can be stored in a memory and may include multiple instructions used to cause a computing device, e.g., a personal computer, a server, a network device, etc., to execute some of or all operations in the methods described in various implementations of the present disclosure. The above memory may include various kinds of media that can store program codes, such as a universal serial bus (USB) flash disk, a read only memory (ROM), a random access memory (RAM), a mobile hard disc drive, a magnetic disk, or an optical disk.

Those of ordinary skill in the art can understand that all or part of the operations in the various methods in the above-mentioned implementations can be completed by a program instructing relevant hardware. The program can be stored in a computer-readable memory. The memory can include a flash disk, a ROM, a RAM, a magnetic disk, a CD, etc.

The implementations of the present disclosure are described in detail above, and specific examples are used in this specification to illustrate the principles and implementation manners of the present disclosure. The illustrations of the above implementations are only used to help understand the methods and core ideas of the present disclosure. Meanwhile, for those of ordinary skill in the art, based on the ideas of the present disclosure, there may be changes on the specific implementations and application scopes. In summary, the content of this specification cannot be construed as limiting the present disclosure.

What is claimed is:

1. A method for sidelink (SL) implementation, comprising:
    obtaining the number of resource bits of a medium access control (MAC) protocol data unit (PDU); and
    reporting the MAC PDU, further comprising reporting an SL buffer status report (BSR) in preference to an uplink (UL) BSR,
    wherein
    reporting the SL BSR in preference to the UL BSR according to the number of the resource bits of the MAC PDU comprises:
    in case that the number of resource bits does not satisfy a condition that a first SL BSR and the UL BSR are able to be fully carried, adding the first SL BSR to the MAC PDU first and then adding part of the UL BSR to the MAC PDU to enable that in the MAC PDU the first SL BSR is contained first and then part of the UL BSR is contained;
    wherein the first SL BSR is data satisfying a set condition in the SL BSR, wherein the set condition comprises that an attribute associated with the SL BSR satisfies an attribute requirement, wherein the attribute associated with the SL BSR comprises an attribute of a logical channel or an attribute of a logical channel group; and
    in case that the number of the resource bits of the MAC PDU satisfies a condition that the first SL BSR and the UL BSR are able to be fully carried, adding the first SL BSR to the MAC PDU first and then adding the UL BSR to the MAC PDU to enable that in the MAC PDU the first SL BSR is contained first and then the UL BSR is contained.

2. The method of claim 1, further comprising:
    in case that the number of resource bits satisfies a condition that the first SL BSR is able to be carried:
    determining that in the MAC PDU the first SL BSR is contained first and then a second SL BSR is contained;
    determining that in the MAC PDU the first SL BSR is contained first and then part of the second SL BSR is contained; or
    determining that in the MAC PDU merely the first SL BSR is contained;
    wherein the second SL BSR is data of the SL BSR not satisfying the set condition.

3. The method of claim 1, wherein the attribute requirement comprises an attribute requirement of a network configuration or pre-configured attribute requirement.

4. The method of claim 1, further comprising:
    executing a BSR timer scheme matching the first SL BSR.

5. The method of claim 1, further comprising:
    canceling an SL BSR event corresponding to the first SL BSR in response to triggering of the first SL BSR.

6. An electronic device, comprising:
    a processor, and
    a memory storing a computer program which, when executed by the processor, causes the processor to perform:
    obtaining the number of resource bits of a medium access control (MAC) protocol data unit (PDU); and
    reporting the MAC PDU comprising reporting an SL buffer status report (BSR) in preference to an uplink (UL) BSR according to the number of the resource bits of the MAC PDU;
    wherein
    reporting the SL BSR in preference to the UL BSR according to the number of the resource bits of the MAC PDU comprises:
    in case that the number of resource bits does not satisfy a condition that a first SL BSR and the UL BSR are able to be fully carried, adding the first SL BSR to the MAC PDU first and then adding part of the UL BSR to the MAC PDU to enable that in the MAC PDU the first SL BSR is contained first and then part of the UL BSR is contained;
    wherein the first SL BSR is data satisfying a set condition in the SL BSR, wherein the set condition comprises that an attribute associated with the SL BSR satisfies an attribute requirement, wherein the attribute associated with the SL BSR comprises an attribute of a logical channel or an attribute of a logical channel group; and in case that the number of the resource bits of the MAC PDU satisfies a condition that the first SL BSR and the UL BSR are able to be fully carried, adding the first SL BSR to the MAC PDU first and then adding the UL BSR to the MAC PDU to enable that in the MAC PDU the first SL BSR is contained first and then the UL BSR is contained.

7. The electronic device of claim 6, wherein the computer program which, when executed by the processor, further causes the processor to:
in case that the number of resource bits satisfies a condition that the first SL BSR is able to be carried,
determine that in the MAC PDU the first SL BSR is contained first and then a second SL BSR is contained;
determine that in the MAC PDU the first SL BSR is contained first and then part of the second SL BSR is contained; or
determine that in the MAC PDU merely the first SL BSR is contained;
wherein the second SL BSR is data of the SL BSR not satisfying the set condition.

8. The electronic device of claim 6, wherein the attribute requirement comprises an attribute requirement of a network configuration or pre-configured attribute requirement.

9. A non-transitory computer-readable storage medium storing a computer program which, when executed by a processor, causes the processor to carry out an action comprising:
obtaining the number of resource bits of a medium access control (MAC) protocol data unit (PDU); and
reporting the MAC PDU comprising reporting a sidelink (SL) buffer status report (BSR) in preference to an uplink (UL) BSR according to the number of the resource bits of the MAC PDU;
wherein
reporting the SL BSR in preference to the UL BSR according to the number of the resource bits of the MAC PDU comprises:
in case that the number of resource bits does not satisfy a condition that a first SL BSR and the UL BSR are able to be fully carried, adding the first SL BSR to the MAC PDU first and then adding part of the UL BSR to the MAC PDU to enable that in the MAC PDU the first SL BSR is contained first and then part of the UL BSR is contained;
wherein the first SL BSR is data satisfying a set condition in the SL BSR, wherein the set condition comprises that an attribute associated with the SL BSR satisfies an attribute requirement, wherein the attribute associated with the SL BSR comprises an attribute of a logical channel or an attribute of a logical channel group; and
in case that the number of the resource bits of the MAC PDU satisfies a condition that the first SL BSR and the UL BSR are able to be fully carried, adding the first SL BSR to the MAC PDU first and then adding the UL BSR to the MAC PDU to enable that in the MAC PDU the first SL BSR is contained first and then the UL BSR is contained.

10. The non-transitory computer-readable storage medium of claim 9, wherein the computer program which, when executed by the processor, further causes the processor to carry out actions comprising:
in case that the number of resource bits satisfies a condition that the first SL BSR is able to be carried:
determining that in the MAC PDU the first SL BSR is contained first and then a second SL BSR is contained;
determining that in the MAC PDU the first SL BSR is contained first and then part of the second SL BSR is contained; or
determining that in the MAC PDU merely the first SL BSR is contained;
wherein the second SL BSR is data of the SL BSR not satisfying the set condition.

11. The non-transitory computer-readable storage medium of claim 9, wherein the attribute requirement comprises an attribute requirement of a network configuration or pre-configured attribute requirement.

* * * * *